United States Patent
Solapurkar

(10) Patent No.: US 9,928,178 B1
(45) Date of Patent: Mar. 27, 2018

(54) MEMORY-EFFICIENT MANAGEMENT OF COMPUTER NETWORK RESOURCES

(71) Applicant: Amazon Technologies, Inc., Seattle, WA (US)

(72) Inventor: Chaitanya Ashok Solapurkar, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 2 days.

(21) Appl. No.: 15/280,859

(22) Filed: Sep. 29, 2016

(51) Int. Cl.
*G06F 12/00* (2006.01)
*G06F 12/0891* (2016.01)
*G06F 12/0864* (2016.01)
*G06F 12/0804* (2016.01)

(52) U.S. Cl.
CPC ...... *G06F 12/0891* (2013.01); *G06F 12/0804* (2013.01); *G06F 12/0864* (2013.01); *G06F 2212/154* (2013.01)

(58) Field of Classification Search
CPC ............. G06F 12/0891; G06F 12/0804; G06F 12/0864; G06F 2212/154
See application file for complete search history.

(56) References Cited

U.S. PATENT DOCUMENTS 9,647,875 B1* 5/2017 Lambert ............... H04L 41/00

* cited by examiner

*Primary Examiner* — Shawn X Gu
(74) *Attorney, Agent, or Firm* — Knobbe, Martens, Olson & Bear, LLP

(57) ABSTRACT

Systems and methods are provided for managing a data store, invalidation requests, and/or resource requests. The system and methods may use one or more data structures, such as hash data structures and/or probabilistic data structures, to achieve various levels of granularity and/or computer resource efficiencies. Further, the invalidation request data may be stored at a front-end layer separate from a data store layer, such that the invalidation requests are processed based on resource requests. In the example, the hash data structure can be used for recent invalidation requests and older request data can be stored in memory-efficient probabilistic data structures. For example, probabilistic filters, such as a bloom filter, can store resource identifiers along with an associated version for space-efficient invalidation comparisons.

20 Claims, 10 Drawing Sheets

US 9,928,178 B1

MEMORY-EFFICIENT MANAGEMENT OF COMPUTER NETWORK RESOURCES

BACKGROUND

In a computer network context, a cache or temporary storage may be used to store network content. The cache may be located near the requesting device, which may enable faster access to content. The use of caches may also reduce bandwidth and server load. After a period of time, the content in the cache may be deleted.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
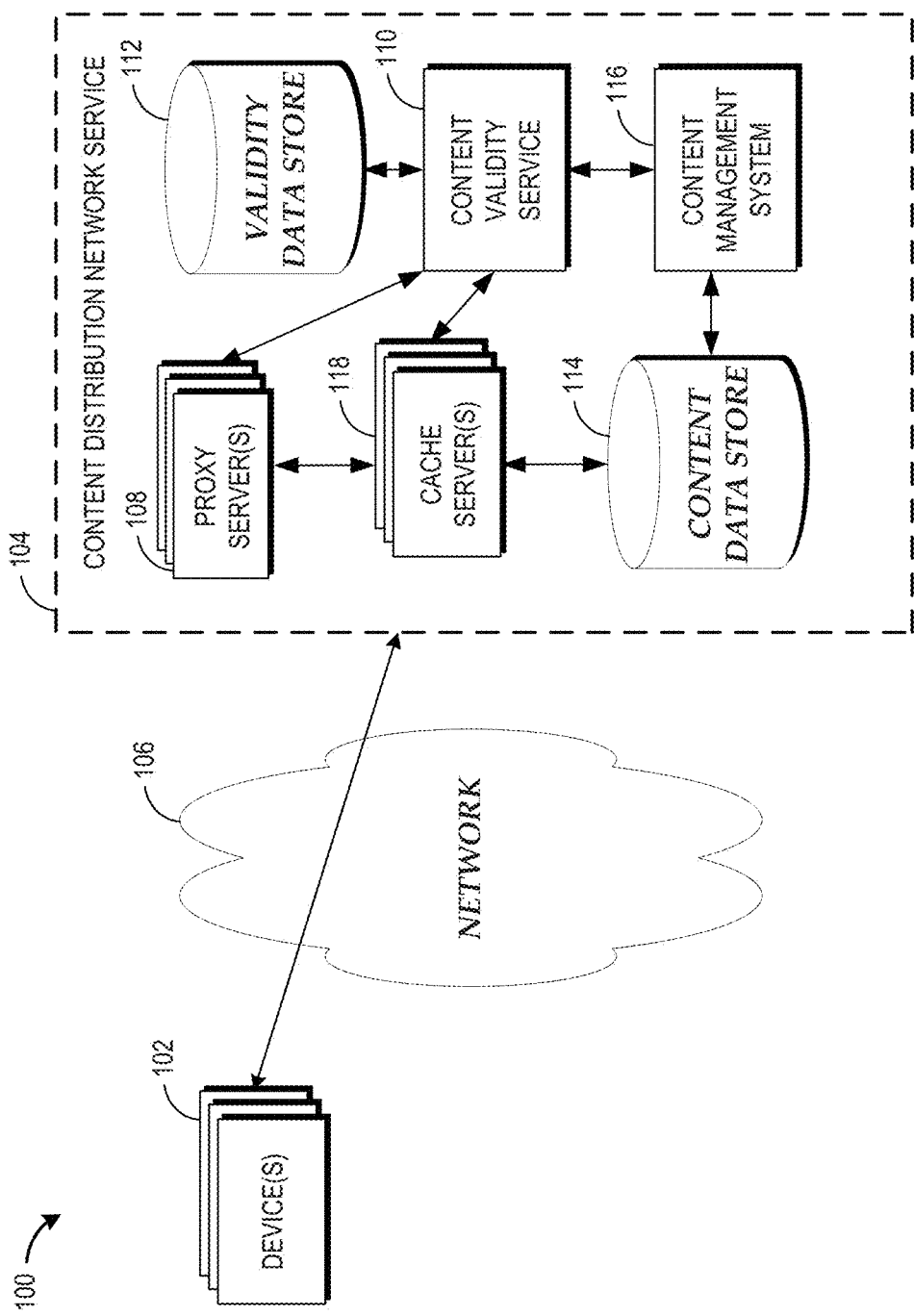
FIG. 1 is a schematic block diagram depicting an illustrative network environment for implementing a content validity service to efficiently manage a resource data store.

Generally described, aspects of the present disclosure are directed to a system and method for efficiently managing a data store. For example, a content delivery network service may include one or more servers for receiving resource requests, such as proxy servers, and one or more data stores to speed up data retrieval, such as caches. The example content delivery network service includes a content management system to handle invalidation requests that cause the invalidation of resources from the one or more data stores. In the example, an invalidation request may be generated when there is a new version of a resource available from a central server and/or the version in the data store is old. The content delivery network service may use one or more methods and/or data structures to efficiently process the invalidation requests. For example, the servers receiving the resource requests may advantageously store invalidation history such that, when a resource request is received, the invalidation history may be used to efficiently determine whether the cached version is valid or invalid. Continuing with the example, the invalidation history may be stored for a period of time in one type of data structure and for other periods of time in other types of data structures, such as a bloom filter, which may be used to determine whether a cached version is likely valid or invalid. Accordingly, the invalidation request history may be stored at a first layer, such as a proxy layer, and the actual invalidations may occur at a later time based on incoming resource requests, which may result in the efficient management of invalidation requests and/or resource requests.

As described herein, a content delivery network service may include a proxy and a cache. In some embodiments, the content delivery network service includes multiple proxy and/or cache servers. The use of multiple servers may advantageously reduce the time delay to respond to a resource request because the request may be routed to the nearest servers. An example content delivery network service may support the invalidation of resources within the cache. For example, the content delivery network service may include an Application Programming Interface (API) that receives invalidation requests for resources. Additionally or alternatively, an administrator may invalidate a resource through a graphical user interface. In response to the invalidation request, each cache instance may process each invalidation request once and/or acknowledge the completion of the invalidation request with the content delivery network service. Example processing of invalidation requests includes removing the resource from a cache instance and/or causing the resource to be inaccessible. Accordingly, there may be a delay to invalidate resources and/or the invalidation process may be resource intensive because the content delivery network service may include many cache servers, such as thousands of cache servers, across a large geographic area, such as the entire world.

The term "resource," as used herein, and in addition to having its ordinary meaning, refers to any data that may be stored in a data store in any data format. For example, a resource identifier, such as a Uniform Resource Identifier (URI) or a Uniform Resource Locator (URL), may be used to identify a resource. An example resource identifier is "http://example.org/page/" that refers to a resource "/page" that may be a Hypertext Markup Language (HTML) page that can be obtained via the Hypertext Transfer Protocol (HTTP) from a network host of a content delivery network service. Other example resource and resource identifiers include "http://example.org/page/icon.png", "http://example.org/example.js", and "http://example.org/example.css". Thus, example resources include files, images, videos, audio, code, etc. In some embodiments, resources may be stored in data stores such as caches.

In some embodiments, the systems and methods described herein for handling invalidation requests may use a probabilistic data structure. Example probabilistic data structures are probabilistic filters, a class of data structures. Example probabilistic filters include a bloom filter, a counting bloom filter, a blocked bloom filter, a quotient filter, or a cuckoo filter, which may be memory efficient. Additional example probabilistic data structures are sketches, such as a count-min sketch. A probabilistic data structure may be used to determine whether an element is a member of a set or a likely member of a set. In the case of a bloom filter, false-positive matches are possible, but false-negative matches are not. The example probabilistic data structure, such as a bloom filter, may be represented as an array of bits. In the bloom filter example, an empty data structure is an array of m bits that are all set to a first indicator, such as zero.

Continuing with the example, an algorithm for generating and using an example bloom filter includes k hash functions, where each hash function maps and/or hashes some set element to one of the m array positions. In some embodiments, the mapping to the positions may be a uniformly random or pseudo-random distribution. Further, k may be smaller than m, which may be proportional to the number of elements to be added. For example, the proportionality of k to m or the type of hash functions may determine the false positive rate of the data structure. To add an element to the data structure, the element is processed by each of the k hash functions to get k array positions. The positions corresponding to these bits are set to a second indicator, such as one. Querying for an element which determines whether the element is in the set or is likely in the set includes processing the element for each of the k hash functions to get k array positions. If any of these bits are set to the first indicator (zero), then the element is definitely not in the set. However, if all of the bit positions are set to the second indicator (one), then that the element is in the set or is likely in the set. In some embodiments, a false positive may be returned.

A probabilistic data structure, such as a bloom filter, may have space advantages over other data structures. Examples of other data structures include self-balancing binary search trees, tries, hash tables, arrays, and/or linked lists of the entries. Other data structures may require storing at least the data items themselves, which can require an arbitrary number of bits (e.g., for strings). However, some probabilistic filters with one percent error rate, for example, and a particular value of k may use approximately 7 to 10 bits per element, regardless of the size of the elements. An example bloom filter has the advantageous property that the time needed either to add items and/or to check whether an item is in the set is a fixed constant, O(k), completely independent of the number of items already in the set.

Another example probabilistic filter is a cuckoo filter. An example cuckoo filter may be similar to bloom filters. Example cuckoo filters support deletion and may have a bounded false positive probability. An example cuckoo filter may have performance advantages over a bloom filter, such as faster insertion and/or lookup times, and/or improved storage efficiency. For example, a cuckoo filter may operate with one hash function. Inserting an entry may include hashing an entry with the hash function, and inserting a fingerprint (a bit string derived from the item using a hash function) of the entry into an open position in two or more alternate buckets. When the two or more buckets are full, the cuckoo filter recursively kicks existing entries to their alternate buckets until space is found and/or attempts are exhausted. Lookups repeat the hash function and check both buckets for the fingerprint. When a matching fingerprint is not found, the entry is definitely not in the filter. When a matching fingerprint is found in either bucket, the entry might be in the cuckoo filter. False positives occur when another entry inserted a matching fingerprint into either of the two checked buckets. Deletion is supported by removing one instance of an entry's fingerprint from either bucket.

The term "hash data structure," as used herein, and in addition to having its ordinary meaning, is a data structure that stores key and value data in an associate manner with hash functions. Example hash data structures are hash maps and hash tables. A hash data structure may map keys to values. In some embodiments, a hash data structure uses a hash function to compute an index into an array of buckets or slots, from which the desired value can be found. As described herein, a hash data structure may be used to store invalidation history, such as a resource identifier for a key and a resource version as a value.

The systems and methods described herein may be intrinsically tied to network and/or computer technology because such solutions may be related to communication over computer networks. For example, processing invalidation requests at the servers receiving resource requests based on when particular resources are requested, such as proxy servers, may decrease network bandwidth. In other words, "lazy" invalidation may more efficiently handle invalidation requests instead of updating every data store and/or cache server globally, which may be very resource intensive. Instead of uniformly invalidating a particular resource version across all or many of the data stores, another advantage of "lazy" invalidation is that invalidations may be processed as resources are requested. For example, resources in some cache servers in some locations may be updated based on particular resource requests directed towards their corresponding proxy servers. However, other cache servers may not need to incur the processing costs because those other cache servers may not be associated with proxy servers that have received requests for the particular resource.

In some embodiments, the systems and methods described herein may be memory-efficient and may decrease the memory footprint of the servers handling the invalidation requests. A content delivery network service and/or content management system may receive millions of invalidation requests for particular resources. For example, five months of invalidation request history at approximately seven to eight million requests per month may correspond to four to five gigabytes of data a server may need to store. The solutions described herein may advantageously reduce the memory requirements for storing invalidation history while maintaining statistically acceptable levels of accuracy with memory-efficient data structures and/or algorithms. Reducing memory requirements for servers may be especially beneficial where it may be cost prohibitive and/or difficult to upgrade and/or increase hardware of the servers, such as memory, storage, and/or processing resources. The one or more data structures may be propagated to front-end servers, such as proxy servers, which may be small in number compared to the number of data store servers, such as cache hosts, and which may result in faster propagation of the invalidation data. The data communication techniques and solutions described herein may also be intrinsically tied to computer networks and/or one or more network protocols, such as HTTP. Accordingly, the systems and techniques described herein are intrinsically tied to computer technology and/or improve the computer itself, such as by reducing memory requirements and/or conserving processing resources.

Further, the "lazy" invalidation algorithms and/or data structures discussed herein may advantageously handle a use case where there may be a popular resource, such as a URL, but the resource is taken down for some reason, such as a legal requirement, and the resource is no longer accessible through a network site. In this use case, the "lazy" invalidation system does not have to perform any work, unlike other invalidation systems, because if the resource is never requested, then the invalidation determination and/or data store version comparisons do not have to occur, which saves computer resources. Moreover, if each data store, such as a cache, individually processed invalidation requests, and the computing system storing the data store goes down, then bringing the computing system back online may require days or weeks of processing the invalidation requests to get caught up. However, the solutions described herein may advantageously shift the invalidation processing to another server, which may allow the server to be taken down and/or brought back online without having to process the invalidation requests.

Turning to FIG. 1, an illustrative network environment 100 is shown in which a content validity service may determine the validity of resources. The network environment 100 may include one or more computing devices 102 and a content distribution network service 104. The content distribution network service 104 may include one or more proxy servers 108, one or more cache servers 112, a content validity service 110, a content management system 116, and a content data store 114. The constituents of the network environment 100 may be in communication with each other either locally or over a network 106.

The computing device 102 may be any computing device capable of communicating over the network 106 and requesting content, such as a laptop or tablet computer, personal computer, personal digital assistant (PDA), hybrid PDA/mobile phone, mobile phone, smartphone, wearable computing device, electronic book reader, set-top or other television box, camera, audiobook player, digital media player, video game console, in-store kiosk, television, appliance, electronic device for inclusion in vehicles or machinery, gaming device, or the like. The computing device 102 may generally be capable of accessing network resources, such as content pages, via the network 106. For example, the computing device 102 may include a browser that accesses content sites and/or requests network resources. Furthermore, the computing device 102 may be capable of transmitting invalidation requests. For example, an administrator of a content site may generate invalidation requests through a user interface that is accessed from the computing device 102 and/or the computing device 102 may transmit invalidation requests through an API of the content distribution network service 104.

In some embodiments, the proxy server 108 may implement and/or be in communication with the content validity service 110. For example, the proxy server 108 may receive a resource request. The content validity service 110 may determine whether the version of the resource corresponding to the request from the cache server 112 is valid. If the version is invalid or is likely invalid, the content validity service 110 may cause the cache server 112 to process an invalidation corresponding to the requested resource. For example, the version of the resource in the cache server 112 may be removed from the cache server 112 and a new version of the resource may be retrieved from the content store 114.

The content management system 116 may receive an invalidation request. An example invalidation request includes a resource identifier. In some embodiments, the content management system 116 generates a version, such as a version identifier, associated with the invalidation request. For example, the content management system 116 may maintain a single resource version, such as a number, and increments the single resource version number to determine a corresponding resource version number for each invalidation request. Additionally or alternatively, an invalidation request may include a resource identifier and a version. The content management system 116 may transmit the invalidation request to the content validity service 110.

The computing device 102 may further be capable of presenting audio and visual content, images, video content, text, user interfaces, and/or user interface controls on a display screen. The computing device 102 may further be capable of receiving user input through a user input device, such as a keyboard, mouse, touchpad, microphone, trackball, touchscreen, image recognition through an input camera (e.g., eye, hand, head, body tracking and/or placement), gamepad, accelerometer, gyroscope, or other input device known in the art.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The validity data store 112 may electronically store, in some embodiments, resource metadata, as further discussed herein. The example resource metadata includes invalidation history data, invalidation requests, and/or data structures storing data related to the invalidation requests. The validity data store 112 may be embodied in hard disk drives, solid state memories, any other type of non-transitory computer-readable storage medium, and/or a file, a database, an object orientated database, document store, a relational database, in-memory cache, and/or stored in any such non-transitory computer-readable media accessible to the content validity service 110. The validity data store 112 may also be distributed or partitioned across multiple local and/or remote storage devices without departing from the spirit and scope of the present disclosure.

The computing device 102, content distribution network service 104, and/or the content validity service 110 may each be embodied in a plurality of devices. For example, the computing device 102 and/or content validity service 110 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the computing device 102 and/or content validity service 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content distribution network service 104 and/or the content validity service 110 may be represented in a single physical server or, alternatively, may be split into multiple physical servers. In some embodiments, the entire content validity service may be represented in a single computing device, such as the computing device 102. Additionally, the environment 100 may not include a network 106.

Additionally, in some embodiments, the content validity service 110 is implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

Figure 2:
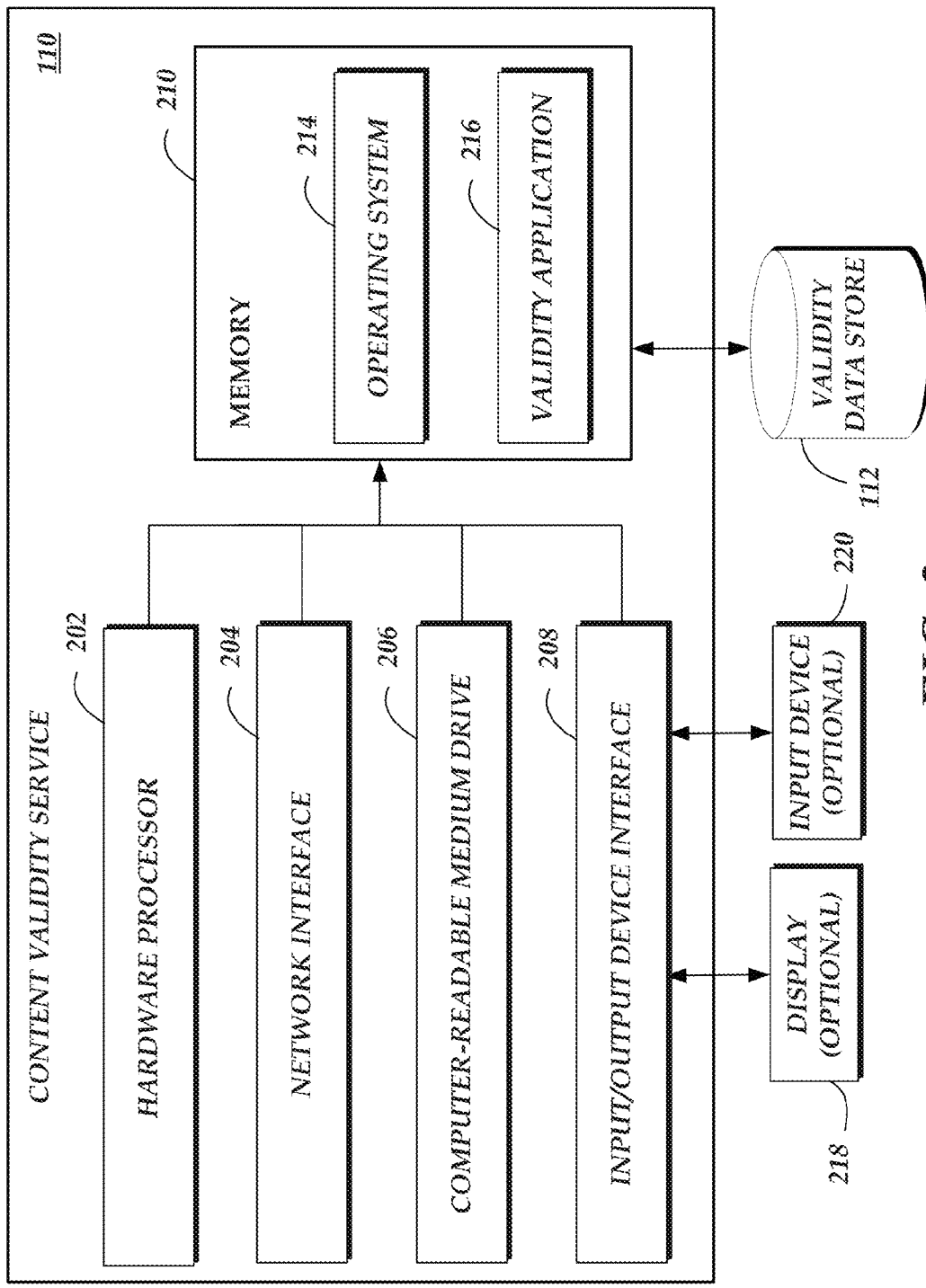
FIG. 2 is a schematic block diagram depicting an illustrative content validity service of the network environment depicted in FIG. 1.

FIG. 2 is a schematic diagram of the illustrative content validity service 110 shown in FIG. 1. The content validity service 110 includes an arrangement of computer hardware and software components that may be used to implement the content validity service. FIG. 2 depicts a general architecture of the content validity service 110 illustrated in FIG. 1. Those skilled in the art will appreciate that content validity service 110 may include more (or fewer) components than those shown in FIG. 2. Further, other computing systems described herein may include similar implementation arrangements of computer hardware and software components.

The content validity service 110 may include a hardware processor 202, a network interface 204, a non-transitory computer-readable medium drive 206, and an input/output device interface 208, all of which may communicate with one another by way of a communication bus. As illustrated, the content validity service 110 is associated with, or in communication with, an optional display 218 and an optional input device 220. In other embodiments, the display 218 and input device 220 may be included in the computing device 102 shown in FIG. 1. The network interface 204 may provide the content validity service 110 with connectivity to one or more networks or computing systems. The hardware processor 202 may thus receive information and instructions from other computing systems (such as the user computing device 102, proxy server 108, cache server 118, and/or the content management system 116) or services via network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the processing unit 202 executes in order to implement one or more embodiments of the content validity service. The memory 210 generally includes RAM, ROM and/or other persistent or non-transitory computer-readable storage media. The memory 210 may store an operating system 214 that provides computer program instructions for use by the processing unit 202 in the general administration and operation of the content validity service 110. The memory 210 may further include other information for implementing aspects of the content validity service 110. For example, the memory 210 may include or communicate with the validity data store 112. In some embodiments, the validity data store may store one or more data structures that can also be loaded into the memory 210.

The memory 210 may include a validity application 216 that may be executed by the processing unit 202. In some embodiments, the validity application 216 may implement various aspects of the present disclosure. For example, the validity application 216 may determine whether a resource in a data store should be invalidated. The validity application 216 may retrieve data entries and/or metadata regarding invalidation requests from the validity data store 112. In some embodiments, the validity application 216 may communicate and/or provide instructions to other computing systems, such as the cache server 118 (shown in FIG. 1), to remove or otherwise invalidate a resource and/or to retrieve a new version of a resource. The validity application 216 may also generate and/or update data structures that represent metadata regarding invalidation requests, such as invalidation history of particular resources. As described herein, the data structures may be probabilistic to obtain storage and/or performance advantages in determining likely or possible invalidation history.

While the validity application 216 is illustrated as implemented by the content validity service 110, in other embodiments, the content validity service 110, and hence the validity application 215, may be implemented partially or entirely by the proxy server 108. For example, the content validity service 110 may be provided as specifically configured application software implemented by hardware on the proxy server 108. Accordingly, the proxy server 108 may include the validity application 216 and other components that operate similarly to the components illustrated as part of the content validity service 110, including a hardware processor 202, network interface 204, non-transitory computer-readable medium drive 206, input/output interface 208, memory 210, and so forth. Further, in some embodiments, some aspects of the validity application 216 may be implemented by the cache server 118. For example, as described herein, the validity application 216 may determine the invalidation history or likely invalidation history for a resource, such as the invalidation version of the resource, and the invalidation version of the resource may be transmitted to the cache server 118. The cache server 118 may then determine whether to return the resource available in the cache or to invalidate the entry and request a new version of the resource. Further, while the present disclosure may highlight advantages of the functionality of the proxy server 108 and the cache server 118 being separate, in some embodiments, functionality of the proxy server 108 and the cache server 118 may be implemented by the same host computing device.

Figure 3:
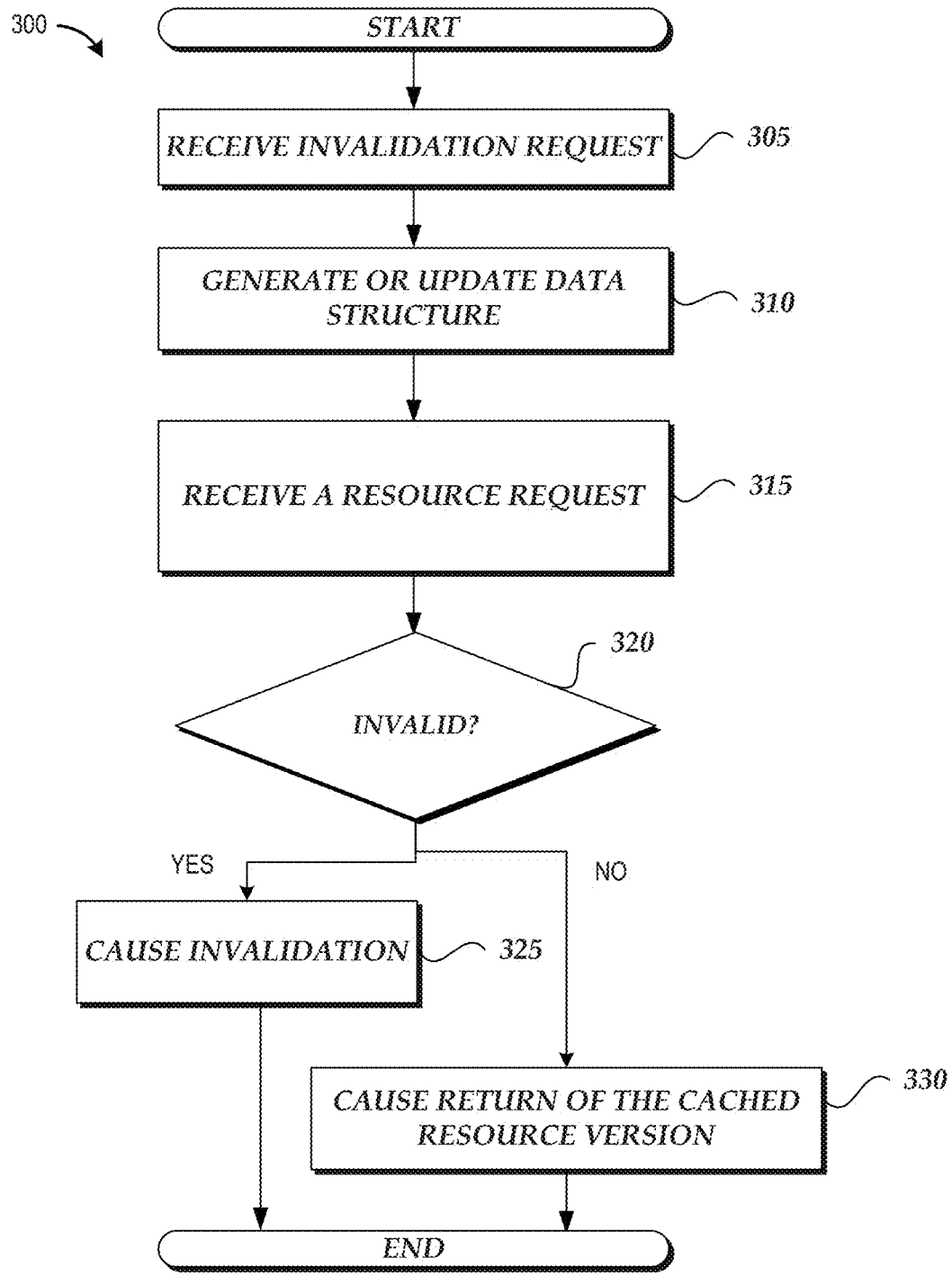
FIG. 3 is a flow diagram depicting an example method for managing invalidation and/or resource requests.

FIG. 3 is a flow diagram depicting an example method 300 implemented by the validity application 216 and/or the content validity service 110 for managing invalidation and/or resource requests. As discussed above, in some embodiments, the proxy server 108 includes the content validity service 110, which in turn includes the validity application 216. In other embodiments, the content management system 116 may include the validity application 216, and may implement the example method 300. In yet other embodiments, functions of the validity application 216 may be distributed between the content validity service 110, the proxy server 108, the cache server 118, and/or the content management system 116.

The example method 300 begins at block 305, where the validity application 216 receives an invalidation request. The example invalidation request includes a resource identifier. The example validity application 216 generates a resource version associated with the invalidation request. In some embodiments, the validity application 216 or another application or service, such as the content distribution network service 104, maintains a single resource version, such as a number, that is used for resource versioning. For example, the validity application 216 maintains a global resource version number and upon receiving a new invalidation request increments the global resource version number and assigns the incremented global resource version number to the invalidation request. Additionally or alternatively, the invalidation request may include a resource version. For example, in other embodiments, instead of a single resource version that is used for multiple resources, the content distribution network service 104 may maintain individual resource versions for each resource, such that two resources may both have the same resource version, such as the version number 15. In some embodiments, the content management system 116 may initially receive the invalidation request and transmit the request to one or more proxy servers and/or the content validity service 110. As described herein, an administrator may generate the invalidation request through interaction with a user interface of the content distribution network service 104 and/or the content distribution network service 104 may receive a request through an API. For example, a site administrator uploads new content to the content distribution service 104 and the resources in the one or more cache servers 118 may be old, which is indicated by the corresponding invalidation request.

At block 310, the validity application 216 generates and/or updates a data structure based on the invalidation request. Example data structures include a hash data structure or probabilistic data structure, such as a probabilistic filter. An example probabilistic filter, such as a bloom filter, includes an array of bits and there are k hash functions that correspond to the bloom filter. Continuing with the example invalidation request, k hash positions are generated for the resource identifier from the k hash functions. In the bloom filter example, each of the k hash positions are updated in the bloom filter to a positive indicator, such as a 1 in a bloom filter comprised of 1 and 0 bits. As will be understood with bloom filters, some of the positions may already be set to a positive indicator if the bloom filter has previously been updated for previous invalidation requests. The validity application 216 may also generate and/or update a hash data structure based on the invalidation request. In the hash data structure example, such as a hash table or hash map, generating and/or updating the hash data structure may include adding the key and value pair to the hash data structure, which corresponds to the resource identifier and the resource version. As described herein, the one or more data structures may be stored in the validity data store 112 and/or the memory 210 of the content validity service 110. As described herein, the content validity service 100, and hence the one or more data structures, may also reside in the proxy server 108. Accordingly, the one or more data structures may be associated with one or more versions or version identifiers. As described herein, examples of a version or version identifier include a resource version, a data structure version, an invalidation version, a bloom filter version, a probabilistic filter version, a maximum resource version, a maximum version, a ceiling version, a minimum resource version, a minimum version, and/or a floor version.

Continuing with the probabilistic data structure example, at block 310, one or more probabilistic and/or bloom filter versions are associated with the probabilistic data structure. In some embodiments, a probabilistic data structure, such as a probabilistic filter, is associated with a probabilistic filter version such that the probabilistic filter version corresponds to the most recent resource version of the invalidation requests associated with the probabilistic filter. In some embodiments, if the probabilistic filter is associated with three invalidation requests with corresponding resource versions of 6,000, 7,000, and 8,000, then the maximum probabilistic filter version would be 8,000. Accordingly, the probabilistic filter is inclusive of and/or represents versions 6,000 and 7,000 since the maximum probabilistic filter is 8,000. Additionally or alternatively, a second or floor probabilistic filter version may correspond to a minimum probabilistic filter version for one or more probabilistic filters, which will be described in further detail herein. Further, the one or more data structures may be associated with a ceiling resource version. For example, the validity application 216 may determine a maximum version from the one or more data structures, such as the hash data structure and/or one or more probabilistic data structures, that can later be used to update the cache version identifier to the ceiling resource version to advantageously avoid unnecessarily updating the resource in the data store, which may improve cache efficiency. The validity application 216 may store one or more associated resource versions along with the probabilistic data structures. For example, in the case of a probabilistic filter, validity application 216 may maintain maximum and/or minimum resource versions as invalidation request data is added to the probabilistic filter.

At block 310 in the method, it is important to note that the invalidation request has been initially processed and/or the invalidation history has been stored; however, the cached resource version in the cache server 118 may still remain in one or more distributed data stores, which may advantageously avoid unnecessarily updating the data stores until a resource request is actually received.

In some embodiments, the validity application 216 or another application or service may generate and/or update the one or more data structures from data accessible from the content management system 116. For example, the content management system 116 may store invalidation requests, which may include a resource identifier, a resource version, and a timestamp corresponding to the time of the request. Accordingly, an application or service may generate one or more data structures, such as a probabilistic filter, by iterating through the set or a subset of invalidation requests and adding the pertinent data from the invalidation request to the probabilistic filter, such as the resource identifiers. Additional metadata, such as maximum and/or minimum resources versions, which are described herein, may be stored along with the data structures. In some embodiments, the content management system 116 generates the one or more data structures from stored invalidation history, and the content management system 116 installs the one or more data structures, such as hash data structures and/or probabilistic data structures, at the proxy servers 108 on a periodic basis. The periodic basis may be configured for particular use cases. For example, the one or more data structures, such as hash data structures and/or probabilistic data structures may be installed at the proxy servers 108 on a predetermined schedule such as hourly, daily, weekly, or some other frequency. Additionally or alternatively, an example hash data structure that is storing invalidation request data, as described herein, could be used to generate one or more probabilistic data structures. For example, if a hash data structure is storing invalidation request data for first time period, such as a week or month, the data in the hash data structure could be archived into one or more probabilistic data structures. Continuing with the example, the data from the hash data structure could be converted to a list, and each entry of the list could be processed by the validity application 216 by adding the corresponding resource identifiers to a probabilistic data structure.

At block 315, the validity application 216 receives a resource request. For example, in the network computing context, a user may request one or more network resources through a browser, such as by accessing a URL through a browser. Accordingly, the computing device 102 may request one or more resources, which may be directed towards the proxy server 108. The example resource request includes a resource identifier.

At block 320, the validity application 216 determines whether the cached resource version is invalid. For example, the validity application 216 determines whether the resource identifier is present in the one or more data structures. In the hash data structure example, the resource version is retrieved from the hash data structure if the resource identifier is present. Additionally or alternatively, in the probabilistic filter example, the validity application 216 determines whether the resource identifier is present in a probabilistic filter, and if so, retrieves the resource version associated with the probabilistic filter. As described herein, presence of the resource identifier in a probabilistic data structure, such as the probabilistic filter, may indicate that the resource is likely invalid since false positives may be permitted. In some embodiments, the validity application 216 or another application or service compares the retrieved resource version with the version of the resource in a data store such as a cache. In the example, if the retrieved resource version from the data structure, which indicates an invalidation or likely invalidation, is later than the version of the resource from the data store, then the application or service determines that the version of the resource in the data store is invalid or likely invalid. For example, if the retrieved version identifier from the data structure is 15 and the version identifier from the data store is 12, then the retrieved version identifier is later than the version identifier from the data store and the resource in the data store should be invalidated. Otherwise, the example application or service determines that the version of the resource in the data store is not invalid. In some embodiments with a probabilistic data structure, such as a probabilistic filter, false negatives are not possible, and, therefore, there should never be a case where an invalidation request that was processed and that corresponds to a time period for a probabilistic filter is falsely reported as not being within the probabilistic filter. If the resource is invalid or likely invalid, the validity application 216 proceeds to block 325.

At block 325, the validity application 216 causes invalidation of the resource. For example, the validity application 216 or another application or service replaces the cached resource with a newer version of the resource. Additionally or alternatively, the example application or service marks the cached resource as inaccessible. In some embodiments, the validity application 216 transmits the retrieved resource version from a data structure to a cache server 118 and the cache server 118 performs the resource version comparison and invalidates the resource. In some embodiments, the invalidated resource may be replaced with a newer version of the resource and returned.

In some embodiments, the validity application 216 retrieves and/or determines a version identifier to update the cache version identifier, such as a number. An example version identifier could be a ceiling resource version number associated with the one or more data structures. In an example with a hash data structure, the validity application 216 determines an invalidation version and/or version identifier that is inclusive of and/or represents each resource version from the hash data structure. For example, if the hash data structure, such as the example hash data structure 604 of FIG. 6A, includes resource version numbers 16, 17, 18, 19, and 20, then the validity application 216 determines an invalidation version associated with the hash data structure that corresponds to the maximum version from the resource versions 16, 17, 18, 19, and 20, which corresponds to the resource version number 20.

In an example with a hash data structure, such as the previous example hash data structure and one or more probabilistic filters, the validity application 216 determines a ceiling resource version that is inclusive of and/or represents the invalidation version associated with the hash data structure (e.g., 20) and a probabilistic filter version associated with each of the one or more probabilistic filters. In the example, the latest resource version is taken from the one or more resource versions associated with the one or more data structures. For example, if the resource version from the hash data structure is the latest (e.g., 20) out of the resource versions from the hash data structure and the one or more resource versions associated with the one or more probabilistic filters, then the validity application 216 determines the ceiling resource version to be the resource version from the hash data structure (here 20).

In an example without a hash data structure, such as two or more probabilistic filters, the validity application 216 determines a ceiling resource version that is inclusive of and/or represents respective probabilistic filter versions associated with each of the one or more probabilistic filters. In an example with a first probabilistic filter associated with a first resource version (such as a version number 100) and a second probabilistic filter associated with a second resource version (such as a version number 50), the validity application 216 determines the ceiling resource version to be the latest version number (version number 100) from the first resource version (version number 100) and the second resource version (version number 50).

In some embodiments, the validity application 216 sets, in the cache, the cache version identifier, such as a number, to the ceiling resource version, such as another version number, to result in an updated cache version identifier. An advantage of the foregoing approach of using a ceiling resource version, is that once the validity application 216 determines an invalidation from one or more data structures the validity application 216 can use the ceiling resource version to update the version number in the cache, which may cause subsequent invalidation checks with the same one or more data structures to fail, thereby improving cache efficiency. For example, if a ceiling version number was not used, there may be cases where the validity application 216 unnecessarily refreshes the resource in the data store. It will be appreciated that once the one or more data structures are updated with new invalidation request data, then subsequent invalidations in the cache may occur as the one or more resource versions associated with the one or more data structures may update as well, which potentially includes updates to a ceiling resource version. In some embodiments, the validity application 216 may determine the ceiling resource version with respect to a particular data structure instead of two or more data structures. In other embodiments, such as where the content distribution network service 104 maintains individual resource versions for each resource, then the validity application 216 may set the cache version number of the resource to the version number associated with the latest resource in the content management system 116 and/or the content data store 114 instead of a ceiling resource version.

At block 330, if the resource is not invalid, the validity application 216 causes the cached resource to be returned to the device or service requesting the resource. For example, the validity application 216 or another application or service retrieves the resource from the data store, such as a cache, and transmits the resource to a user computing device. In a computer networking example, the cached resource may correspond to a network resource such as a content page or content associated with a content page.

Figure 4:
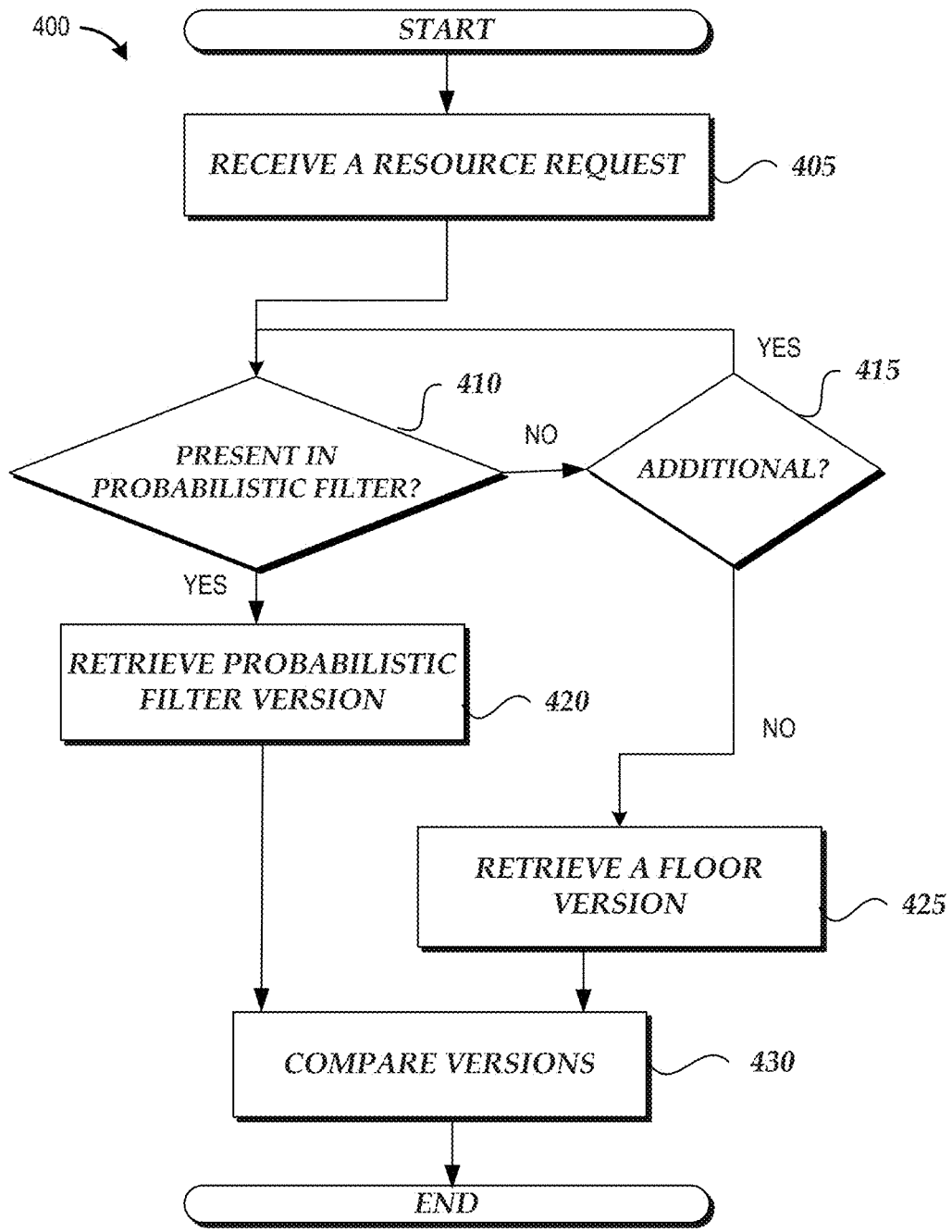
FIG. 4 is a flow diagram depicting another example method for managing invalidation and/or resource requests with a probabilistic data structure.

FIG. 4 is a flow diagram depicting an example method 400 implemented by the validity application 216 and/or the content validity service 110 for managing invalidation and/or resource requests with a probabilistic data structure, such as a probabilistic filter. In some embodiments, in the context of the example method 400, the proxy server 108 includes the content validity service 110, which in turn includes the validity application 216. In other embodiments, the content management system 116 may include the validity application 216, and may implement the example method 400. In yet other embodiments, functions of the validity application 216 may be distributed between the content validity service 110, the proxy server 108, the cache server 118, and/or the content management system 116. As described herein, some of the blocks of illustrative method 400 may be similar to some blocks of the example method 300 of FIG. 3 described above. Further, the example method 400 may be combined with one or more of the example methods described herein, such as the method 300 of FIG. 3.

At block 405, the validity application 216 receives a resource request. The validity application 216 receiving a resource at block 405 may be similar to block 316 of the example method 300 of FIG. 3 described above. For example, the computing device 102 may request one or more resources, which may be directed towards the proxy server 108. The example resource request includes a resource identifier.

At block 410, the validity application 216 determines whether the resource identifier is present in a probabilistic data structure, such as a probabilistic filter. In the probabilistic filter example, the validity application 216 generates one or more hashes from the resource identifier and one or more hash functions associated with the probabilistic filter. As described herein, the validity application 216 determines whether there are positive indicators, such as positive bits of an array of the bloom filter, at the positions corresponding to the one or more hashes. Accordingly, the validity application 216 determines the set membership of the resource identifier. As described herein and in some embodiments, a probabilistic filter has the general property of possibly returning false positives but not returning false negatives for set membership tests. If the resource identifier is present in the probabilistic filter, then the validity application 216 proceeds to block 420.

At block 420, the validity application 216 retrieves a version associated with the probabilistic data structure such as the probabilistic filter. For example, the validity application 216 retrieves a probabilistic filter version associated with the probabilistic filter. As used herein, "bloom filter version," "probabilistic filter version," "maximum resource version," and "maximum version" may be used interchangeably. In some embodiments and as described herein, a probabilistic filter is associated with a maximum resource version, which may correspond to the maximum and/or latest version of invalidation requests associated with the probabilistic filter. For example, if the probabilistic filter is associated with three invalidation requests with corresponding resource versions of 6,000, 7,000, and 8,000, then the probabilistic filter version would be 8,000. In some embodiments, each probabilistic data structure, such as a probabilistic filter, is associated with a particular probabilistic filter version.

At block 415, if the resource identifier is not present in the first probabilistic data structure, such as a first probabilistic filter, the validity application 216 determines if there are additional probabilistic data structures to additionally check. For example, in some embodiments, two or more probabilistic data structures, such as probabilistic filters, may be generated where each probabilistic data structure is associated with a predetermined time. For example, a first probabilistic filter is associated with a first time period, a second probabilistic filter is associated with a second time period, a third probabilistic filter is associated with a third time period, etc. In some embodiments, the first, second, etc., time periods may each correspond to a predetermined time period such as a month. In other embodiments, the first, second, third, etc., time periods may each correspond to different predetermined time periods, such as one month, two months, four months, etc., respectively. The different predetermined time periods may correspond to any time series pattern such as exponentially and/or linearly growing time periods. As shown in FIG. 4, the validity application 216 may continue checking for the presence of the resource identifier in additional data structures until there are no more data structures to check and/or some other stopping condition is triggered. If there are no more additional data structures to check and presence of the resource identifier has not been identified, then the validity application 216 proceeds to block 425.

At block 425, the validity application 216 retrieves a floor resource version associated with the one or more probabilistic data structures, such as probabilistic filters. As used herein, "floor resource version," "minimum resource version," "floor version," and "minimum version" may be used interchangeably. In some embodiments and as described herein, one or more probabilistic filters are associated with a floor resource version, which may correspond to a bound of the one or more probabilistic data structures such that the one or more probabilistic data structures is not associated with an invalidation request for a resource version older and/or lower than the predetermined floor resource version. For example, if the one or more probabilistic filters are associated with six invalidation requests with corresponding resource versions of 3,000, 4,000, 5,000, 6,000, 7,000, and 8,000, then the floor resource version would be 3,000. The validity application 216 may use the floor resource version because the validity application 216 may not store invalidation requests older than a predetermined period and/or lower than a predetermined version, such that any resource older and/or lower than the floor resource version should be invalidated, as described herein. In some embodiments, two or more probabilistic data structures, such as two or more probabilistic filters, are associated with the same minimum version, in contrast to the maximum versions that may be each associated with particular data structures.

At block 430, the validity application 216 compares the retrieved version, which could be a maximum or minimum resource version, to the resource version in a data store. The block 430 may be similar to block 320 of the example method 300 of FIG. 3 as described above. For example, the validity application 216 or another application or service compares the retrieved resource version with the version of the resource in a data store such as a cache. In the example, if the retrieved resource version from the probabilistic data structure, which indicates a possible or likely invalidation, is older and/or lower than the version identifier (such as a cache version identifier) of the resource from the data store, such as the cache, then the application or service takes the necessary action such as invalidating the resource, as described herein. In some embodiments, if the retrieved invalidation resource version is 15 and the version identifier of the resource from the data store is 15, then the two resource versions are equal, and an invalidation should not occur. As another example, if the retrieved invalidation resource version is 15 and the version identifier of the resource from the data store is 10, then the cache version is older and/or lower than the invalidation resource version, and an invalidation should occur. As another example, if the retrieved invalidation resource version is 10 and the version identifier of the resource from the data store is 15, then the cache version is not older and/or lower than the invalidation resource version, and an invalidation should not occur. Thus, the example application or service determines that the version of the resource in the data store is not invalid and may cause the cached resource to be returned, as described herein. As also described herein, the validity application 216 may update the resource version number in the data store to a ceiling resource version associated with and/or determined from the one or more probabilistic filters.

Figure 5:
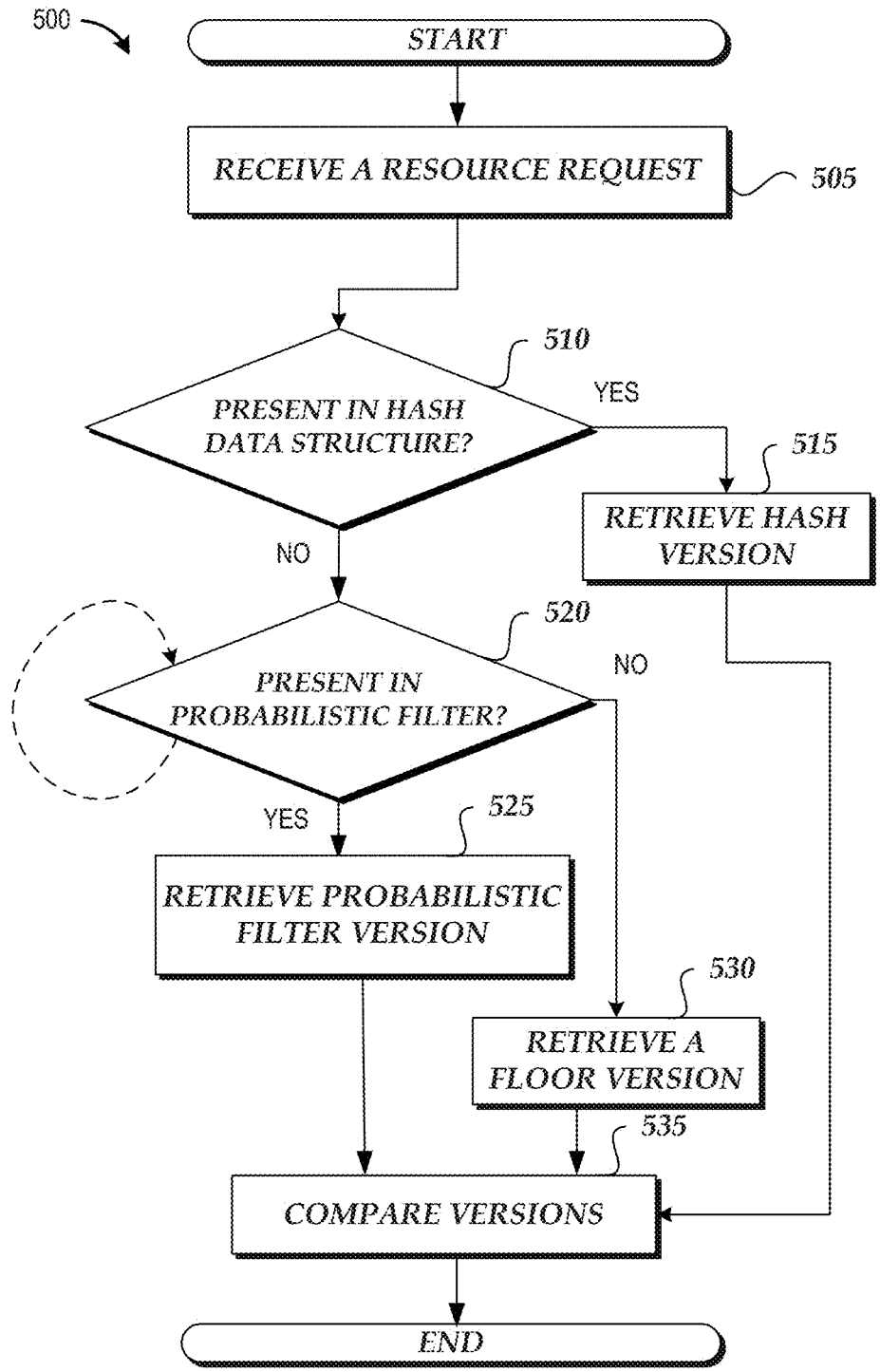
FIG. 5 is a flow diagram depicting yet another example method for managing invalidation and/or resource requests with multiple types of data structures.

FIG. 5 is a flow diagram depicting an example method 500 implemented by the validity application 216 and/or the content validity service 110 for managing invalidation and/or resource requests with multiple types of data structures. In some embodiments in the context of the example method 500, the proxy server 108 includes the content validity service 110, which in turn includes the validity application 216. In other embodiments, the content management system 116 may include the validity application 216, and may implement the example method 500. In yet other embodiments, functions of the validity application 216 may be distributed between the content validity service 110, the proxy server 108, the cache server 118, and/or the content management system 116. As described herein, some of the blocks of illustrative method 500 may be similar to some blocks of the example methods 300 and/or 400 of FIGS. 3 and 4 described above, respectively.

In some embodiments, there are advantages for the example method 500 for managing invalidation and/or resource requests with multiple types of data structures. For example, using a hash data structure that stores invalidation history, such as resource identifiers and corresponding resource invalidation version, may provide a high degree of accuracy and/or granularity, but may also use memory and/or resources. In the example, a hash data structure storing five months of invalidation request history at approximately seven to eight million requests per month may correspond to four to five gigabytes of data, which may strain the resources of a server. Accordingly, additionally or alternatively, different data structures may be used that sacrifice some precision but which have less storage and/or memory requirements. In the example, more recent invalidation requests, such as within the last week, two weeks, or a month, may be stored in the hash data structure, but older invalidation requests may be stored in one or more probabilistic data structures, such as a probabilistic filter, which use less storage and/or memory. As described herein, probabilistic filters may have space advantages, such as being able to compress data without providing false negatives while having the possibility of providing a false positive. Moreover, in some embodiments, multiple probabilistic data structures, such as probabilistic filters, may be used for different time periods with different granularities while also taking advantage of the space efficiency features of the probabilistic data structures. For example, the data structures, which correspond to time periods, may be exponentially weighted. An example of time periods and corresponding probabilistic data structures may correspond to storing a first week of data in a hash data structure; the next two weeks of data, such as weeks two and three, may be stored in a first probabilistic filter; the next eight weeks or two months of data, such as weeks four through eleven, may be stored in a second probabilistic filter; and the remainder of the year's data may be stored in a third probabilistic filter; and so forth. In some embodiments, after a predetermined period of time, invalidation history may no longer be stored. As described herein, other exponential or other time period series may be used by the validity application 216 for storing data in two or more data structures.

At block 505, the validity application 216 receives a resource request. The validity application 216 receiving a resource at block 505 may be similar to block 316 of the example method 300 of FIG. 3 and/or block 405 of the example method 400 of FIG. 4 described above. For example, the computing device 102 may request one or more resources, which may be directed towards the proxy server 108. The example resource request includes a resource identifier.

At block 510, the validity application 216 determines whether the resource identifier is in the hash data structure 510. In some embodiments, the validity application 216 generates a hash from the resource identifier using a hash function associated with the hash data structure 510. The hash is an index for the hash data structure. Then, to determine whether the resource identifier is present in the hash data structure, the validity application 216 checks whether there is a value (e.g., the invalidation request resource version) at the index. In the example, if there is a value, then the resource identifier is present in the hash data structure; otherwise, there is no value at the index, and the resource identifier is not present in the hash data structure. If the validity application 216 determines that the resource identifier is present in the hash data structure, then the validity application proceeds to block 515 to retrieve the resource version. In the example, the resource version may be a number or value that corresponds to the invalidation request version of the resource, which may be stored at the indexed entry of the hash data structure. If the validity application 216 determines that the resource identifier is absent from the hash data structure, then the validity application 216 proceeds to block 520.

At block 520, the validity application 216 determines whether the resource identifier is present in a probabilistic data structure, such as a probabilistic filter. The validity application 216 determining whether the resource identifier is present in the example probabilistic filter at block 520 may be similar to block 410 of the example method 400 of FIG. 4 described above. For example, the validity application 216 calculates and/or generates one or more hashes from one or more hash functions associated with the probabilistic filter using the resource identifier as an input to the one or more hash functions. Each of the one or more hashes correspond to an index of the example bloom filter array, which can be checked by the validity application 216 to determine set membership of the resource identifier in the probabilistic filter, as described herein. Further, the looping arrow at block 520 indicates there may be one or more additional probabilistic data structures, such as probabilistic filters, to check for the presence of the resource identifier, which may be similar to blocks 410 and 415 of the example method 400 of FIG. 4 described above. Accordingly, the validity application 216 may continue checking for the presence of the resource identifier in additional probabilistic data structures, such as probabilistic filters, until there are no more data structures to check and/or some other stopping condition. If the validity application 216 determines the set membership of the resource identifier in an example probabilistic filter, e.g., that the resource identifier is present in the probabilistic filter, then the validity application 216 proceeds to block 525.

At block 525, the validity application 216 retrieves a version associated with the probabilistic data structure, such as the probabilistic filter, for which set membership was determined. The validity application 216 retrieving an example probabilistic filter version at block 520 may be similar to block 420 of the example method 400 of FIG. 4 described above. For example, the validity application 216 retrieves a probabilistic filter version associated with the probabilistic filter where there was set membership. In some embodiments and as described herein, a probabilistic filter is associated with a maximum resource version, which may correspond to the maximum and/or latest version of invalidation requests associated with the probabilistic filter for that particular time period that corresponds to the probabilistic filter.

At block 530, if there are no more additional data structures to check and set membership of the resource identifier has not been identified, then the validity application 216 retrieves a floor resource version associated with the one or more probabilistic data structures, such as probabilistic filters. The validity application 216 retrieving an example floor resource version at block 530 may be similar to block 425 of the example method 400 of FIG. 4 described above. In some embodiments and as described herein, one or more probabilistic filters are associated with a floor resource version, which may correspond to a bound of the one or more probabilistic filters such that the one or more probabilistic filters is not associated with an invalidation request for a resource version older and/or lower than the floor resource version.

At block 535, the validity application 216 compares the retrieved version, which could be from the example hash data structure, one or more probabilistic filters, or a floor resource version, to the resource version in a data store. The block 535 may be similar to block 320 of the example method 300 of FIG. 3 and/or block 420 of the example method 400 of FIG. 4 as described above. For example, the validity application 216 or another application or service compares the retrieved resource version with the version of the resource in a data store such as a cache. In the example, if the retrieved resource version from the example hash data structure, one or more probabilistic filters, or a floor resource version, which indicates an invalidation or possible invalidation, is later than the version of the resource (such as a cache version identifier) from the data store, such as the cache, then the application or service takes the necessary action such as invalidating the resource, as described herein. As described herein, the validity application 216 may update the resource version number in the data store to a ceiling resource version associated with and/or determined from the one or more data structures, such as the hash data structure and/or the one or more probabilistic filters. Otherwise, the example application or service determines that the version of the resource in the data store is not invalid and may cause the cached resource to be returned, as described herein. In some embodiments, the retrieved version is transmitted to another processing layer, such as the cache layer, server, and/or service, which handles the comparison.

Figure 6A:
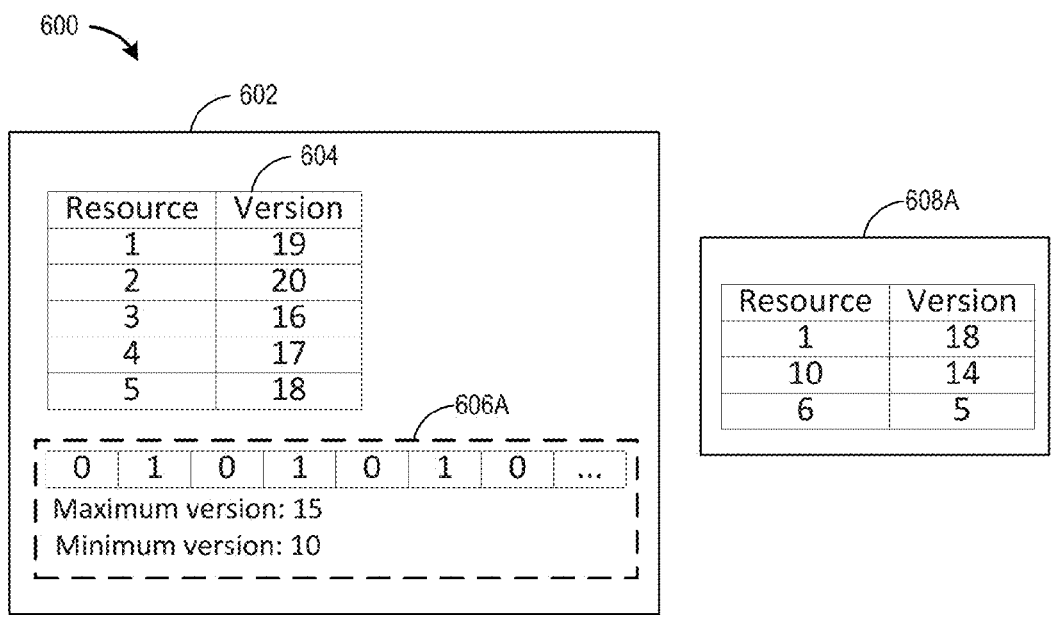
FIGS. 6A-6G are pictorial diagrams depicting an example sequence of data structures and data stores for efficiently managing invalidation and/or resource requests.

FIGS. 6A-6G illustrate example data environments 600 for determining whether to invalidate one or more resources. In FIG. 6A, the example data environment 600 includes a first data store 602 and a second data store 608A. In some embodiments, the first data store is accessed by the proxy server 108 shown in FIG. 1. In some embodiments, the second data store is accessed by the cache server 118 shown in FIG. 1. The first data store 602 may include a first data structure 604 and a second data structure 606A. In some embodiments, the first data structure 604 corresponds to a hash data structure, such as a hash table and/or hash map. The example second data structure 606A corresponds to a probabilistic data structure, such as a bloom filter. While a bloom filter may be illustrated as data structure 606A it will be appreciated that the example may apply to other probabilistic data structures. The second data store 608A may store resources and/or the versions of resources, such as cache resources, as described herein. FIGS. 6B-6G may include many similar elements as FIG. 6A, such as the first and second data stores and data structures.

In a first example, a first resource request is received. In the example, the first resource request is includes an identifier for resource 1. In response, a service, such as the content validity service 110, determines whether the resource 1 identifier is in the first data structure 604. In some embodiments, determining whether the resource 1 identifier is present involves hashing the resource 1 identifier (a key) to an index and retrieving the value for the index (if one exists). If the resource 1 identifier is not present, e.g., there is no value for the index in the hash data structure, then no value and/or a null value is returned. As illustrated, the resource 1 identifier is in the first data structure 604 and version 19 is returned. In the example, the first data structure 604 may correspond to resource versions 16 to 20 and/or a first time period, as described herein.

Figure 6B:
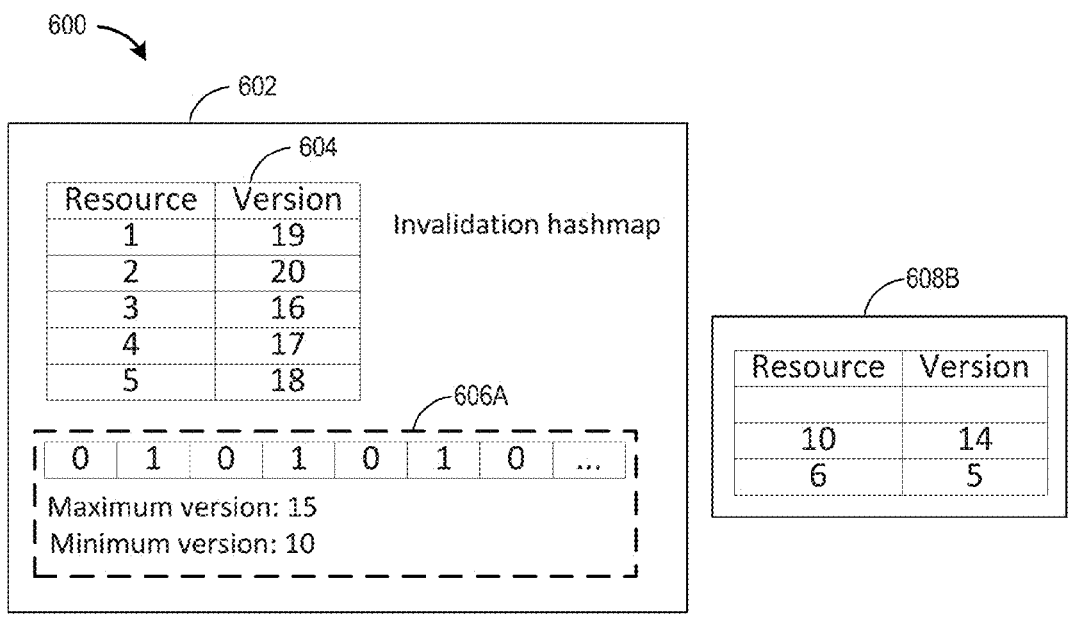
Figure 6C:
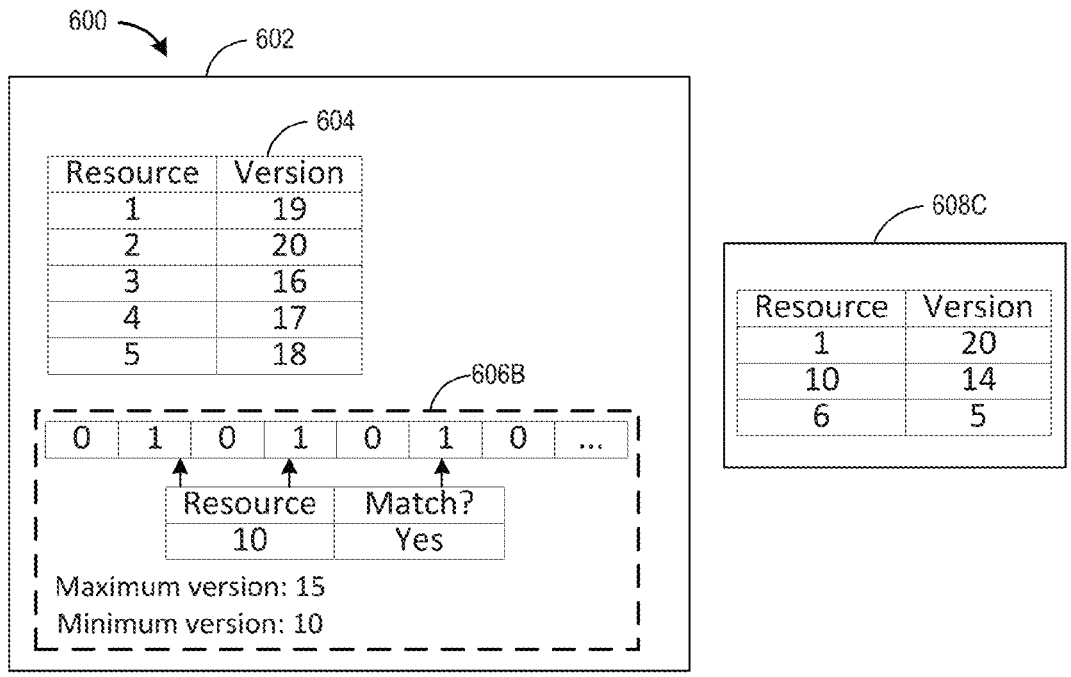

Continuing with the example request for resource 1, the content validity service 110 queries the second data store 608A. In the example, the content validity service 110 compares the invalidation version of resource 1 from the first data store 602, version 19, to the current resource version from the second data store 608A, version 18. Accordingly, the version of resource 1 in the second data store 608A is old and/or should be invalidated. Turning to FIG. 6B, the entry for resource 1 may be invalidated, such as being removed, as shown in the second data store 608B. Turning to FIG. 6C, a new entry for resource 1 may be retrieved. As illustrated, the second data store 608C includes version 20 of resource 1. As described herein, the content validity service 110 may update the resource version number in the second data store 608C to a ceiling resource version determined from the first data structure 604 and the second data structure 606B. For example, the content validity service 110 determines a single resource ceiling version number from the latest version identifier from the first data structure 604 (here, version number 20) and the version identifier associated with the second data structure 606B (here maximum version number 15), which corresponds to the version 20. Accordingly, subsequent queries and/or requests for resource 1 would receive the latest version of resource 1 corresponding to version 20 (until a new invalidation request is received and/or the entry is evicted, such as by a least recently used object policy).

In another example, a second example request is received in FIG. 6C. The second example request may include a request for the resource 10. In some embodiments, the first data structure 604 corresponds to a first time period. An example first time period is a one month time period, which may correspond to invalidation versions 17 to 20. Continuing with the example, the content validity service 110 determines whether the resource 10 identifier is in the first data structure 604. In the example, the resource 10 identifier is not present. The example content validity service 110 determines whether the resource 10 identifier is present in the second data structure 606B. In some embodiments, the second data structure 606B corresponds to maximum and/or minimum versions. The example second data structure 606B corresponds to a maximum version 15 and a minimum version 10. Further, the example second data structure 606B corresponds to a second time period, such as a second month. As illustrated, the content validity service 110 determines that the resource 10 identifier is present in the second data structure 606B. For example, the resource 10 identifier is hashed to k positions within the second data structure 606B, which correspond to one bits, and, therefore, indicate that the resource 10 identifier is likely present in the set. Since the resource 10 identifier was not in the first data structure 604, such as the hash table and/or hash map, but was present in the second data structure 606B, the bloom filter, the maximum version of the second data structure 606B, version 15, is used as the version for the invalidation version of resource 10.

Figure 6D:
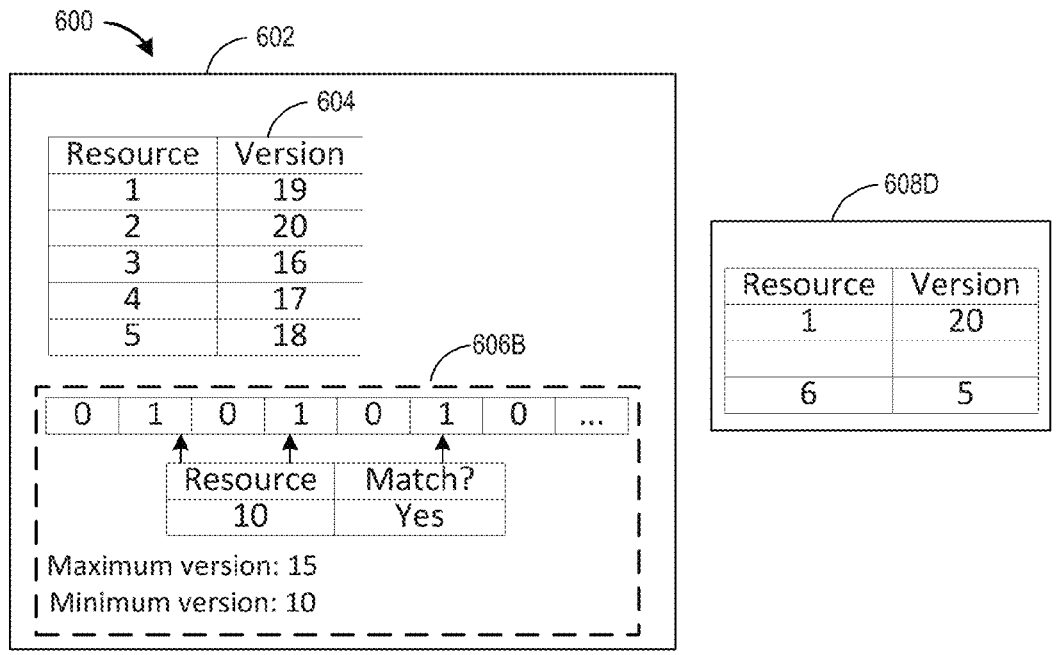
Figure 6E:
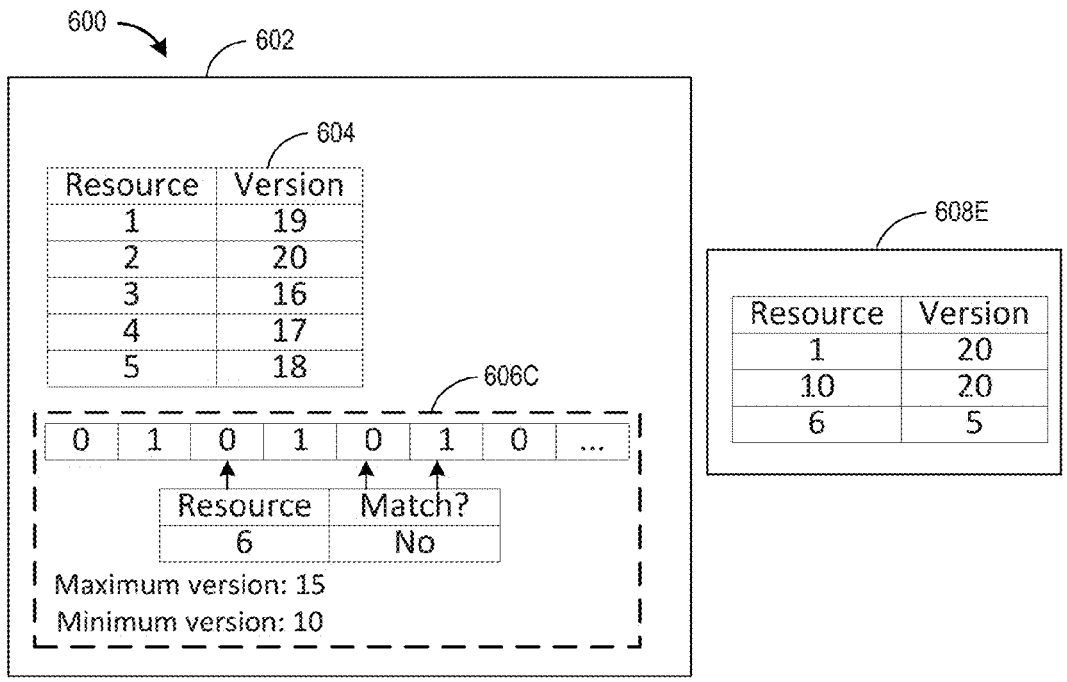

Continuing with the second example request for resource 10, the content validity service 110 queries the second data store 608C. The example content validity service 110 compares the resource version of resource 10 from the first data store 602 (and in particular the second data structure 606B), version 15, to the version from the second data store 608C, version 14. Accordingly, the version of resource 10 in the second data store 608C is old and/or should be invalidated. Turning to FIG. 6D, the entry for resource 10 may be invalidated, such as being removed, as shown in the second data store 608D. Turning to FIG. 6E, a new entry for resource 10 may be retrieved. As illustrated, the second data store 608E includes a latest version of resource 10, which, in some embodiments, may be assigned the resource version number 20 that also corresponds to the ceiling version, as described herein. Similar to the invalidation of resource 1, the invalidation of resource 10 causes subsequent queries and/or requests for resource 10 to receive the latest version of resource 10. As described herein, the invalidation of entries shown in FIGS. 6A-6G are "lazy" in that the actual invalidations occur when resource are requested and not when the invalidation requests are received. Moreover, each of the invalidations may occur locally and at different times since there may be numerous proxy servers and/or cache servers spread over a large geographic area. For example, a request for resources 1 or 10 may occur at a first proxy server and/or cache server, which causes invalidation at the first cache server, but a request for resources 1 or 10 does not occur at a second proxy server and/or cache server and the second cache server does not need to be updated, which is an example of lazy and/or resource-efficient invalidation.

In yet another example, a third example request is received in FIG. 6E. The third example request may include a request for the resource 6. The example content validity service 110 determines whether the resource 6 identifier is in the first data structure 604. In the example, the resource 6 identifier is not present in the first data structure 604. The example content validity service 110 determines whether the resource 6 identifier is present in the second data structure 606C. The example second data structure 606C corresponds to a maximum version 15 and a minimum version 10. As illustrated, the content validity service 110 determines that the resource 6 identifier is not present in the second data structure 606C. For example, the resource 6 identifier is hashed to k positions within the second data structure 606C, which correspond to at least one zero bit, and, therefore, indicate that the resource 6 identifier is not present in the set. Since the resource 6 identifier was not in the first data structure 604, such as the hash table and/or hash map, and was not present in the second data structure 606C, the bloom filter, the minimum version of the second data structure 606C, version 10, is used as the version for the invalidation version of resource 6. In the example, there may be only one probabilistic data structure for another time period other than the first time period. Accordingly, the content validity service 110 may use a minimum version for invalidations since invalidations older and/or lower than version 10 may no longer be stored. Accordingly, to avoid returning a stale resource, the content validity service 110 uses the minimum version of the probabilistic data structure even though a resource identifier corresponding to an invalidation request was not present in the probabilistic data structure.

Figure 6F:
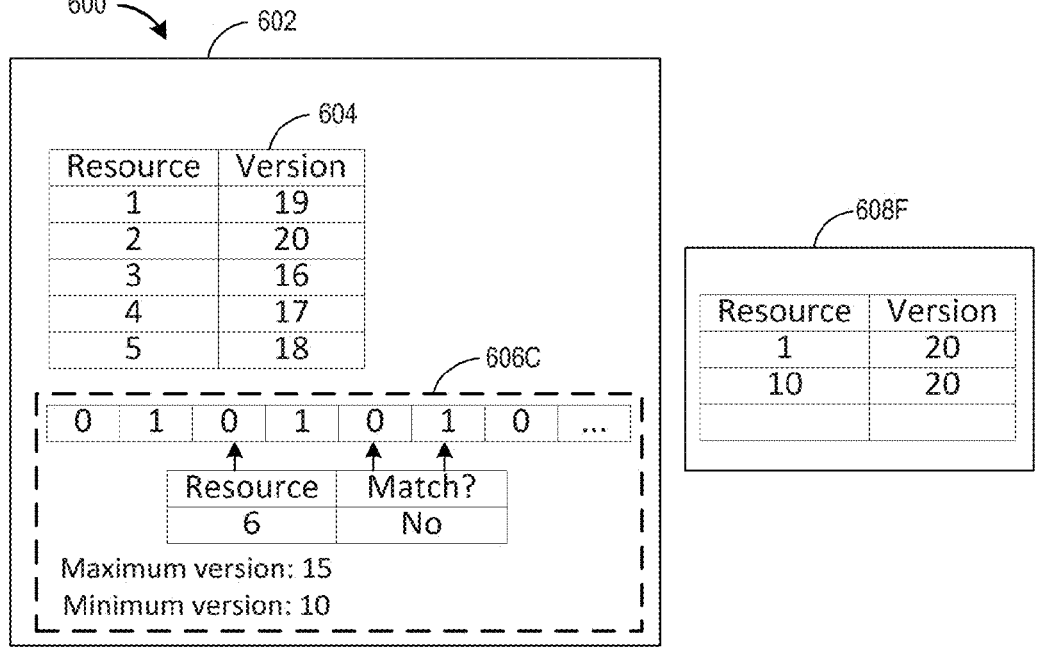
Figure 6G:
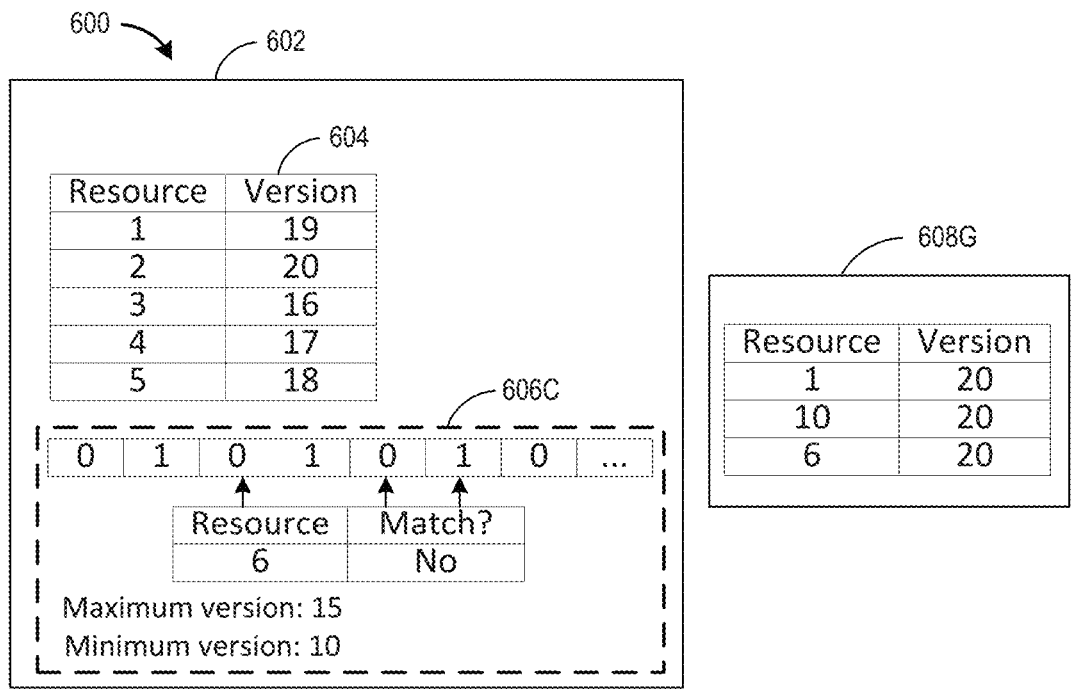

Continuing with the third example request for resource 6, the content validity service 110 queries the second data store 608F. The example content validity service 110 compares the resource version of resource 6 from the first data store 602 (and in particular the minimum version of the second data structure 606C), version 10, to the version from the second data store 608E, version 5. Accordingly, the version of resource 6 in the second data store 608E is old and/or should be invalidated. Turning to FIG. 6F, the entry for resource 6 may be invalidated, such as being removed, as shown in the second data store 608F. A new entry for resource 6 may be retrieved. Turning to FIG. 6G, a new entry for resource 6 may be retrieved. As illustrated, the second data store 608G includes a latest version of resource 106 which, in some embodiments, may be assigned the resource version number 20 that also corresponds to the ceiling version, as described herein. Similar to the invalidation of resources 1 and 10, the invalidation of resource 6 would cause subsequent queries and/or requests for resource 6 to receive the latest version of resource 6.

Figure 7:
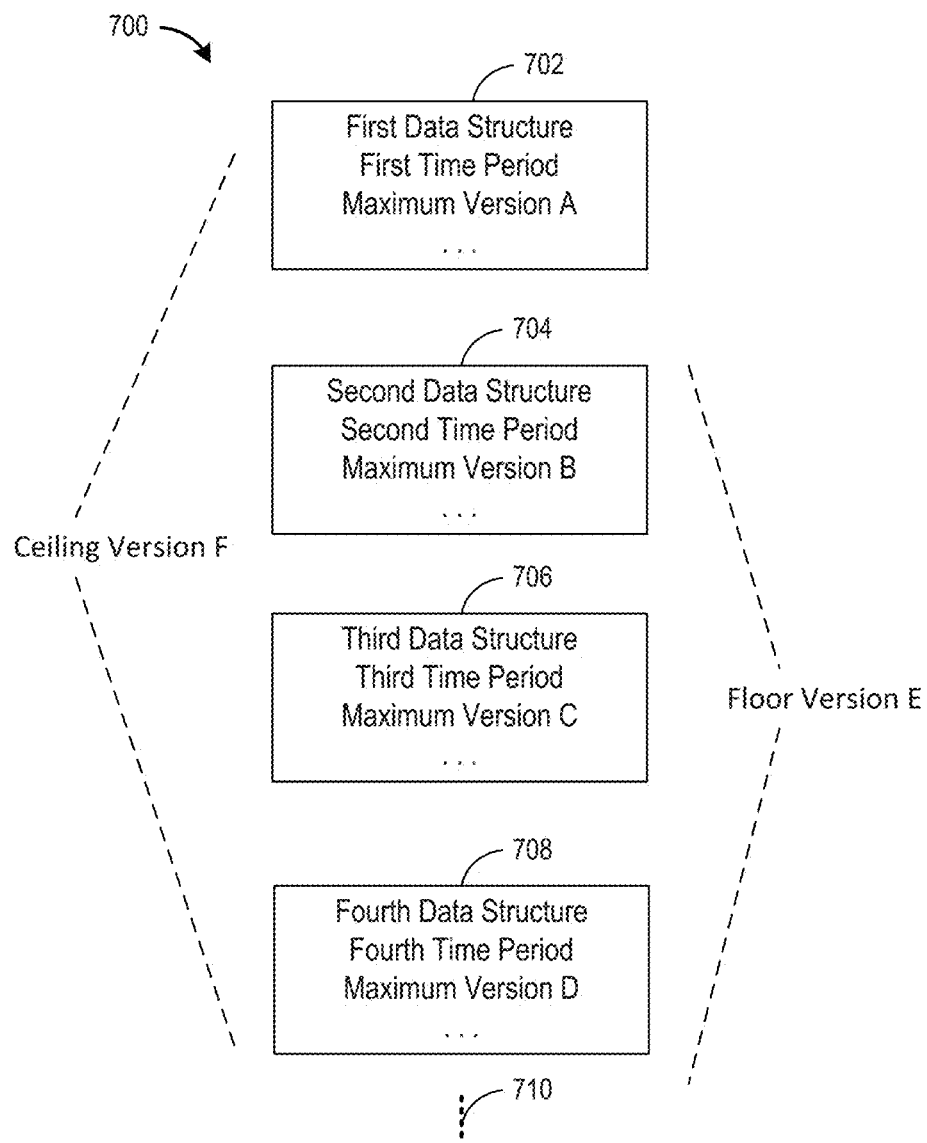
FIG. 7 is a pictorial diagram depicting an example collection of data structures for efficiently managing invalidation and/or resource requests.

FIG. 7 is a pictorial diagram depicting an example collection of data structures for efficiently managing invalidation and/or resource requests. In FIG. 7, the example data environment 700 includes a first data structure 702, a second data structure 704, a third data structure 706, and a fourth data structure 708. The illustrated ellipsis 710 indicates that the example data environment 700 may include additional data structures. The example first data structure is a hash data structure and may be associated with a first time period, such as one week, one month, etc. In some embodiments, the first data structure includes invalidation requests from the first time period. In the example, an advantage of the first data structure of being a hash data structure is that the first data structure provides a high level of accuracy, such as a 100% accuracy and/or granularity rate of representing invalidation requests received in the first time period.

Continuing with the example, the example data environment 700 includes subsequent data structures for different time periods. The example second data structure 704 is associated with invalidation requests from a second time period, such as weeks two and three or subsequent months. The example second data structure 704 is a probabilistic data structure, such as a probabilistic filter, which is associated with invalidation requests from the second time period by storing set membership data for those resource identifiers from the invalidation requests from the second time period. In the example, an advantage of the second data structure of being a probabilistic data structure is that the second data structure may have space advantages over the first data structure, but may sacrifice some accuracy compared to the first data structure. For example, the second data structure may provide some false positives based on the configuration of the second data structure. In the bloom filter example, the number and efficacy of the hash functions and the size of the array may affect the false positive rate of the second data structure.

As described herein, the one or more data structures may be associated with one or more versions. For example, the second data structure may be associated with a maximum version B, which may correspond to a bloom filter version, which corresponds to the most recent resource version of the invalidation requests associated with the second data structure. Further as illustrated, the second data structure 704, the third data structure 706, and the fourth data structure 708, etc., may be collectively associated with a floor version E. The floor version E may have the property that no invalidation request associated with the second data structure 704, the third data structure 706, and the fourth data structure 708, etc., may have a resource version that is older and/or lower than the floor version E. As described herein, the data structures may stop storing invalidation data after predetermined one or more time periods, and, therefore, any resource older and/or lower than the minimum probabilistic filter version, floor version E, should be invalidated. In some embodiments, the one or more data structures may be associated with a ceiling resource version F. The ceiling version F may have the property that it is inclusive of and/or represents one or more resource versions associated with the one or more data structures. For example, the ceiling version F may correspond to the newest version from the maximum versions A-D. In examples where the first data structure 702 corresponds to a hash data structure, the maximum version A corresponds to the latest resource version from the hash data structure, as described herein. In examples where the second, third, and fourth data structures, etc., correspond to probabilistic data structures, such as probabilistic filters, each of the probabilistic data structures are associated with a respective maximum version. Accordingly, in some examples, if maximum version A is the newest version from the versions A-D, then the ceiling version F corresponds to the version A.

Continuing with the example, the second data structure 704, the third data structure 706, and the fourth data structure 708, etc., may be configured such that the older versions a particular data structure encompasses, the more false positives may be permitted by the configuration. In some embodiments, the data structures may be configured in an exponential manner, a linear manner, or some other series. In the exponential example, weeks two and three may be stored in the second data structure 704, the next eight weeks or two months of data, such as weeks four through eleven, may be stored in the third data structure 706, and the remainder of the year's data may be stored in the fourth data structure 708, and so forth. Continuing with the example, each of the probabilistic data structures 704, 706, and 708 may be configured to tolerate increasing false positive rates in an exponential manner. Accordingly, there may be an exponential relationship between respective false positive rates of corresponding probabilistic data structures, and/or an exponential relationship between the respective time periods of invalidation requests corresponding to particular probabilistic data structures. There may be a general property of example probabilistic data structures that where there is a greater the false positive rate, then the probabilistic data structure may approximately represent greater invalidation requests without greatly increased memory and/or storage requirements. In the probabilistic filter example, the type of hash function used may be configured to tolerate higher false positive rates such as by reducing or increasing the number of collisions. In the bloom filter example, the number of hash functions and/or array size for each particular bloom filter may be configured to tolerate higher false positive rates. For example, a first configuration of a first probabilistic filter may differ from a second configuration of a second probabilistic filter for least one of a respective number of hash functions, a respective type of hash function, or a respective size of an array that results in a different false positive rate and/or space efficiency. However, because of the particular data structure configurations, the data structures corresponding to larger time periods, such as several months or one year, may be approximate in size or smaller than the data structures corresponding to smaller time periods but that have lower false positive rates. Accordingly, the collection of data structures may provide various levels of granularity with respect to determining invalidations. In the example, a higher false positive rate may correspond to greater space efficiency and also greater cache misses in that more resources are invalidated from the data stores and may have to be replaced.

While a network form is often used as an example herein, it will be appreciated that methods for efficiently managing resources and/or caches, as disclosed herein, may be used in a variety of environments other than for network forms.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing computer network resources, the computer-implemented method comprising:
    under control of a computer hardware processor configured with specific computer-executable instructions,
        receiving an invalidation request comprising a resource identifier;
        generating a first resource version corresponding to the invalidation request;
        indicating, in a bloom filter, set membership of the resource identifier and generating an updated bloom filter, wherein the updated bloom filter is associated with a bloom filter version that represents at least the first resource version;
        receiving a resource request comprising the resource identifier;
        determining that the resource identifier is not indicated by a hash data structure;
        generating a hash from the resource identifier;
        determining, based at least part on the hash, that the resource identifier is in the set membership of the updated bloom filter;
        determining that a cache version identifier of a resource corresponding to the resource identifier is lower than the bloom filter version; and
        causing invalidation of the resource in a cache.

2. The computer-implemented method of claim 1, further comprising:
    receiving a second resource request comprising a second resource identifier;
    determining that the second resource identifier is indicated by the hash data structure;
    retrieving a second resource version corresponding to the second resource identifier from the hash data structure;
    determining that a second cache version identifier of a second resource corresponding to the second resource identifier is lower than the second resource version; and
    causing invalidation of the second resource in the cache.

3. The computer-implemented method of claim 1, further comprising:
    receiving a second resource request comprising a second resource identifier;
    determining that the second resource identifier is not indicated by the updated bloom filter;
    determining set membership of the second resource identifier from a second bloom filter, wherein the second bloom filter is associated with a second bloom filter version; and
    transmitting the second bloom filter version to a computing device.

4. The computer-implemented method of claim 3, wherein the updated bloom filter is associated with a first invalidation request from a first time period, and the second bloom filter is associated with a second invalidation request from a second time period different from the first time period.

5. The computer-implemented method of claim 4, wherein the updated bloom filter is configured to permit a lower false positive rate than the second bloom filter, and the first time period is smaller than the second time period.

6. The computer-implemented method of claim 1,
receiving a second resource request comprising a second resource identifier;
determining that the second resource identifier is not indicated by the updated bloom filter;
retrieving a predetermined floor resource version that indicates a bound of the updated bloom filter such that the updated bloom filter is not associated with an invalidation request for a resource version lower than the predetermined floor resource version; and
determining that a second cache version identifier of a second resource corresponding to the second resource identifier is lower than the predetermined floor resource version; and
causing invalidation of the second resource in the cache.

7. A system for managing computer network resources in a cache, the system comprising:
a first computing device comprising a computer hardware processor that executes specific computer-executable instructions to cause the system to at least:
receive a resource request comprising a resource identifier;
determine that the resource identifier is not indicated by a first data structure, the first data structure associated with requests to invalidate resources in one or more caches during a first period of time;
generate a hash from the resource identifier;
determine that the resource identifier is indicated by a second data structure based at least in part on the hash;
determine a second version identifier associated with the second data structure; and
cause invalidation of a resource in a first cache based at least in part on the second version identifier.

8. The system of claim 7, wherein the second data structure is a probabilistic filter.

9. The system of claim 7, wherein the first computing device is further configured to at least:
receive a second resource request comprising a second resource identifier;
determine that the second resource identifier is indicated by the first data structure;
retrieve a second resource version corresponding to the second resource identifier from the first data structure; and
transmit the second resource version.

10. The system of claim 7, wherein the first computing device is further configured to at least:
determine a first version identifier that represents each resource version from the first data structure; and
determine a ceiling resource version that represents the first version identifier and the second version identifier, wherein causing invalidation of the resource in the first cache further comprises:
setting, in the first cache, a cache version identifier to the ceiling resource version to result in an updated cache version identifier.

11. The system of claim 7, wherein the first computing device is further configured to at least:
receive a second resource request comprising a second resource identifier;
determine that the second resource identifier is not indicated by the second data structure;
determine set membership of the second resource identifier from a third data structure, wherein the third data structure is associated with a third version identifier; and
transmit the third version identifier.

12. The system of claim 7, wherein the first computing device is further configured to at least:
receive a second resource request comprising a second resource identifier;
determine that the second resource identifier is not indicated by the first data structure;
determine that the second resource identifier is not indicated by the second data structure; and
cause the first cache to provide a second resource corresponding to the second resource identifier.

13. The system of claim 12, wherein the second data structure is a bloom filter.

14. A system for managing computer network resources in a cache, the system comprising:
an electronic data store; and
a first computing device comprising a computer hardware processor that executes specific computer-executable instructions to cause the system to at least:
receive an invalidation request comprising a resource identifier;
generating a first resource version corresponding to the invalidation request;
indicate, in a first data structure, the inclusion of the resource identifier, and generate an updated first data structure, wherein the updated first data structure is associated with a first data structure version that is inclusive of the first resource version;
receive a resource request comprising the resource identifier;
generate a hash from the resource identifier;
determine, based at least in part on the hash, that the resource identifier is indicated by the updated first data structure; and
cause invalidation of a resource in a first cache based at least in part on the first data structure version and based at least in part on the resource identifier indicated by the updated first data structure.

15. The system of claim 14, wherein the first computing device is further configured to at least:
receive a second resource request comprising a second resource identifier;
determine that the second resource identifier is not indicated by the updated first data structure;
determine set membership of the second resource identifier from a second data structure, wherein the second data structure is associated with a second data structure version; and
transmit the second data structure version.

16. The system of claim 15, wherein the updated first data structure is associated with a first invalidation request from a first time period, and the second data structure is associated with a second invalidation request from a second time period different from the first time period.

17. The system of claim 16, wherein the updated first data structure is configured to permit a lower false positive rate than the second data structure, and the first time period is smaller than the second time period.

18. The system of claim 15, wherein a first configuration of the updated first data structure is different from a second configuration of the second data structure for least one of: a respective number of hash functions, a respective type of hash function, or a respective size of an array.

19. The system of claim 15, wherein the first computing device is further configured to at least:
determine a ceiling resource version that is inclusive of the first data structure version and the second data structure version, wherein causing invalidation of the resource in the first cache further comprises:
setting, in the first cache, a cache version identifier to the ceiling resource version to result in an updated cache version identifier.

20. The system of claim 14, wherein the first computing device is further configured to at least:
receive a second resource request comprising a second resource identifier;
determine that the second resource identifier is not indicated by the updated first data structure;
retrieve a predetermined floor resource version that indicates a bound of the updated first data structure such that the updated first data structure is not associated with an invalidation request for a resource version lower than the predetermined floor resource version;
determine that a second cache version identifier of a second resource corresponding to the second resource identifier is lower than the predetermined floor resource version; and
cause invalidation of the second resource in the first cache.

\* \* \* \* \*